United States Patent
Sadakane et al.

(10) Patent No.: US 10,502,954 B2
(45) Date of Patent: Dec. 10, 2019

(54) LAMINATED GLASS

(71) Applicant: AGC Inc., Chiyoda-ku (JP)

(72) Inventors: Shunsuke Sadakane, Chiyoda-ku (JP); Shunpei Oosumi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/994,225

(22) Filed: May 31, 2018

(65) Prior Publication Data

US 2018/0348516 A1 Dec. 6, 2018

(30) Foreign Application Priority Data

Jun. 2, 2017 (JP) .................................. 2017-109820
Apr. 27, 2018 (JP) .................................. 2018-087220

(51) Int. Cl.
*G02B 27/01* (2006.01)
*G02B 27/00* (2006.01)
(Continued)

(52) U.S. Cl.
CPC ...... *G02B 27/0101* (2013.01); *B32B 17/1011* (2013.01); *B32B 17/10036* (2013.01);
(Continued)

(58) Field of Classification Search
CPC ........ B32B 17/10036; B32B 17/10559; B32B 17/10568; B32B 17/10633;
(Continued)

(56) References Cited

U.S. PATENT DOCUMENTS 5,812,332 A 9/1998 Freeman
2002/0054993 A1 5/2002 Nagai
(Continued)

FOREIGN PATENT DOCUMENTS

JP H07-175007 7/1995
JP 2017-502125 1/2017
(Continued)

OTHER PUBLICATIONS

M. Achintha, "Sustainability of glass in construction", Woodhead Publishing, 2016, pp. 79-104.
(Continued)

*Primary Examiner* — Sultan Chowdhury
(74) *Attorney, Agent, or Firm* — Oblon, McClelland, Maier & Neustadt, L.L.P.

(57) ABSTRACT

A laminated glass includes first and second glass plates to be arranged on the inside and the outside of a vehicle, respectively; an interlayer located between the first and second glass plates and bonded to the first and second glass plates; and a display area used for a head up display, including a region having a wedge shape in a cross section, a thickness at an upper end of the region in a vertical direction being greater than a thickness at a lower end of the region. A difference, $\Delta t$ [mm], between a thickness of the laminated glass at a thickest portion in the display area and a thickness at a thinnest portion, and a difference, $\Delta Tv$ [%], between a visible light transmittance of the laminated glass at the thickest portion in the display area and a visible light transmittance at the thinnest portion, satisfy a relation of $\Delta Tv \geq 2.2\Delta t$.

19 Claims, 8 Drawing Sheets

(51) Int. Cl.
*B32B 17/10* (2006.01)
*G03B 21/62* (2014.01)

(52) U.S. Cl.
CPC .. *B32B 17/10082* (2013.01); *B32B 17/10568* (2013.01); *B32B 17/10761* (2013.01); *G02B 27/0018* (2013.01); *B32B 2250/03* (2013.01); *B32B 2250/40* (2013.01); *G02B 2027/012* (2013.01); *G03B 21/62* (2013.01)

(58) Field of Classification Search
CPC ........ B32B 17/10761; B32B 17/10981; G02B 27/0017; G02B 27/0018; G02B 27/0101; G02B 27/0172
See application file for complete search history.

(56) References Cited

U.S. PATENT DOCUMENTS

| | | | |
|---|---|---|---|
| 2008/0176043 A1* | 7/2008 | Masaki | B32B 17/10036 428/172 |
| 2014/0193646 A1 | 7/2014 | Kitano et al. | |
| 2016/0236446 A1 | 8/2016 | Nakayama et al. | |
| 2016/0243796 A1 | 8/2016 | Mannheim Astete et al. | |
| 2016/0257095 A1* | 9/2016 | Cleary | G02B 27/01 |
| 2016/0291324 A1 | 10/2016 | Arndt et al. | |
| 2016/0341960 A1 | 11/2016 | Miyai | |
| 2017/0274630 A1 | 9/2017 | Oota et al. | |
| 2017/0274631 A1 | 9/2017 | Oota et al. | |
| 2017/0305240 A1 | 10/2017 | Aoki et al. | |
| 2017/0313032 A1* | 11/2017 | Arndt | B32B 17/10036 |
| 2017/0334759 A1 | 11/2017 | Yamato et al. | |
| 2018/0264785 A1 | 9/2018 | Oota et al. | |
| 2018/0326706 A1* | 11/2018 | Oota | B32B 17/10 |
| 2019/0143649 A1* | 5/2019 | Oota | B32B 17/10541 |

FOREIGN PATENT DOCUMENTS

| | | |
|---|---|---|
| WO | WO 2016/052422 | 4/2016 |
| WO | WO 2016/117650 | 7/2016 |
| WO | WO 2016/121559 | 8/2016 |
| WO | WO 2017/057630 | 4/2017 |

OTHER PUBLICATIONS

U.S. Office Action in U.S. Appl. No. 16/151,572, dated Oct. 21, 2019.

* cited by examiner

LAMINATED GLASS

CROSS-REFERENCE TO RELATED APPLICATION

The present application is based on and claims benefit of priority under 35 U.S.C. § 119 of Japanese Patent Applications No. 2017-109820, filed Jun. 2, 2017 and No. 2018-087220, filed Apr. 27, 2018. The contents of the application are incorporated herein by reference in their entirety.

BACKGROUND OF THE INVENTION

1. Field of the Invention

The disclosure herein generally relates to a laminated glass.

2. Description of the Related Art

In recent years, head-up displays (in the following, also referred to as an "HUD") have become more and more popular. In a head-up display, an image is reflected on a front windshield of a vehicle so that predetermined information is displayed in a driver's view. However, for driver viewing of a view on an outside of the vehicle or of the information displayed by the HUD, there may be a case where a double image is a problem.

A double image that becomes a problem for a driver of a vehicle includes a transmitted double image and a reflected double image. When the front windshield includes a HUD display area used for the HUD and an area on an outside of the HUD display area (transparent area) that is not used for the HUD, although a transmitted double image may be a problem in the HUD display area, generally a reflected double image is the main problem, and in the area on an outside of the HUD display area a transmitted double image is a problem.

It has been known that such a reflected double image or transmitted double image can be reduced by using, for a front windshield, a laminated glass having a wedge shape in a cross section viewed from a horizontal direction. For example, a laminated glass obtained by holding with two glass plates an interlayer having a wedge shape in a cross section and a wedge angle of the interlayer being changed depending on a site on the front windshield has been proposed (See, for example, Japanese Translation of PCT International Application Publication No. JP-T-2017-502125).

SUMMARY OF THE INVENTION

Technical Problem

However, in both the case of providing a region of a constant wedge angle on a front windshield, and the case of providing a region of a variable wedge angle on the front windshield, it is difficult to control the wedge angle precisely, and a certain amount of error occurs in the wedge angle. Thus, the reflected double image may not be controlled sufficiently.

The present invention was made in view of the aforementioned problem, and aims at providing a laminated glass having a wedge angle, in which a reflected image is inconspicuous even when an error occurs in the wedge angle.

Solution to Problem

An aspect of the present invention provides a laminated glass including a first glass plate to be arranged on an inside of a vehicle; a second glass plate to be arranged on an outside of the vehicle; an interlayer located between the first glass plate and the second glass plate and bonded to the first glass plate and the second glass plate; and a display area configured to be used for a head up display. The display area includes a region having a wedge shape in a cross section, a thickness at an upper end of the region in a vertical direction being greater than a thickness at a lower end of the region, when the laminated glass is installed on the vehicle.

A difference in thickness, $\Delta t$ [mm], between a thickness of the laminated glass at a thickest portion in the display area and a thickness of the laminated glass at a thinnest portion in the display area, and a difference in visible light transmittance, $\Delta Tv$ [%], between a visible light transmittance of the laminated glass at the thickest portion in the display area and a visible light transmittance of the laminated glass at the thinnest portion in the display area, satisfy a relation of $\Delta Tv \geq 2.2 \Delta t$.

Effect of Invention

According to an aspect of the present invention, a laminated glass having a wedge angle, in which a reflected image is inconspicuous even when an error occurs in the wedge angle, is provided.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

Figure 1A:
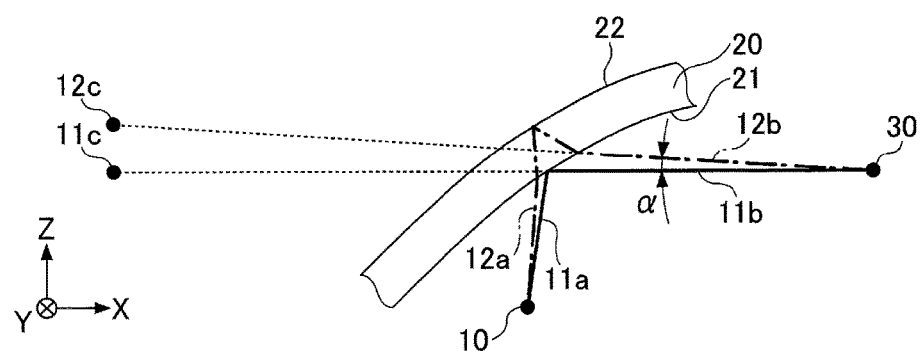
FIGS. 1A and 1B are diagrams for explaining a concept of a double image.

In the following, with reference to drawings, embodiments of the present invention will be described. In each drawing, the same reference numeral is assigned to the same component, and redundant explanation will be omitted.

[Reflected Double Image, Transmitted Double Image]

Figure 1B:
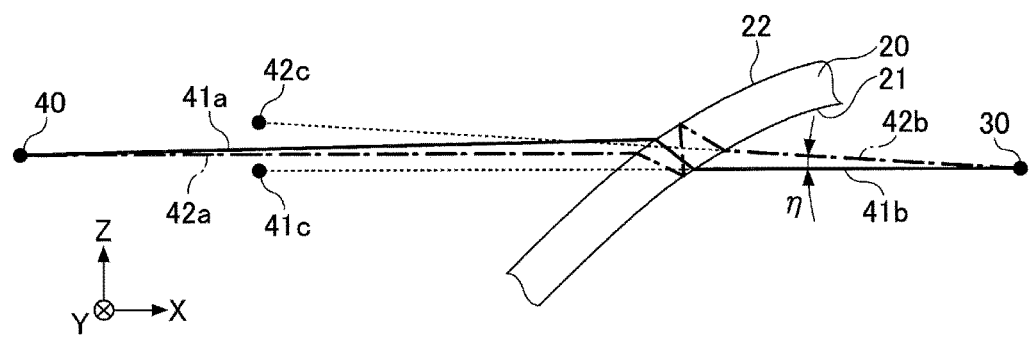

First, concepts of a reflected double image and a transmitted double image will be described. FIGS. 1A and 1B are diagrams for explaining a concept of a double image. FIG. 1A illustrates a reflected double image, and FIG. 1B illustrates a transmitted double image. In FIGS. 1A and 1B, a front-back direction of a vehicle in which the front windshield 20 is installed is an X-direction, a left-right direction of the vehicle is a Y-direction, and a direction perpendicular to an XY-plane is a Z-direction (The same applies to subsequent drawings).

As illustrated in FIG. 1A, a part of light beam 11a emitted from a light source 10 of HUD is reflected on an interior surface 21 of the front windshield 20 of the vehicle, and guided to an eye 30 of a driver as a light beam 11b (primary beam), and is visually recognized by the driver as an image 11c (virtual image) in front of the front windshield 20.

Moreover, a part of light beam 12a emitted from the light source 10 of HUD enters an interior from the interior surface 21 of the front windshield 20 of the vehicle, and is refracted. A part thereof is reflected on an exterior surface 22. Then, furthermore, the part thereof emerges from the interior surface 21 to the outside of the front windshield 20 of the vehicle by refraction, and guided to the eye 30 of the driver as a light beam 12b (secondary beam), and is visually recognized by the driver as an image 12c (virtual image).

In this way, the two images 11c and 12c visually recognized by the driver are reflected double images. Moreover, an angle between the light beam 11b (primary beam) and the light beam 12b (secondary beam) is an angle $\alpha$ of the reflected double image. The angle $\alpha$ of the reflected double image is preferably close to zero. In the present application, in the case where the secondary beam is observed upward viewed from a driver, the reflected double image is defined to have a positive value.

Moreover, as illustrated in FIG. 1B, a part of a light beam 41a emitted from a light source 40 enters an interior from the exterior surface 22 of the front windshield 20 of the vehicle and is refracted. Then, a part thereof emerges to the outside of the front windshield 20 from the interior surface 21 and is refracted, and guided to the eye 30 of the driver as a light beam 41b, and visually recognized by the driver as an image 41c.

Moreover, a part of a light beam 42a emitted from the light source 40 enters an interior from the exterior surface 22 of the front windshield 20 of the vehicle and is refracted. A part thereof is reflected on the interior surface 21. Then, furthermore, the part thereof is reflected on the exterior surface 22, and furthermore a part thereof emerges out of the front windshield 20 from the interior surface 21 and is refracted, and guided to the eye 30 of the driver as a light beam 42b, and visually recognized by the driver as an image 42c.

In this way, the two images 41c and 42c visually recognized by the driver are transmitted double images. Moreover, an angle between the light beam 41b (primary beam) and the light beam 42b (secondary beam) is an angle $\eta$ of the transmitted double image. The angle $\eta$ of the transmitted double image is preferably close to zero.

[Front Windshield (Laminated Glass)]

Figure 2A:
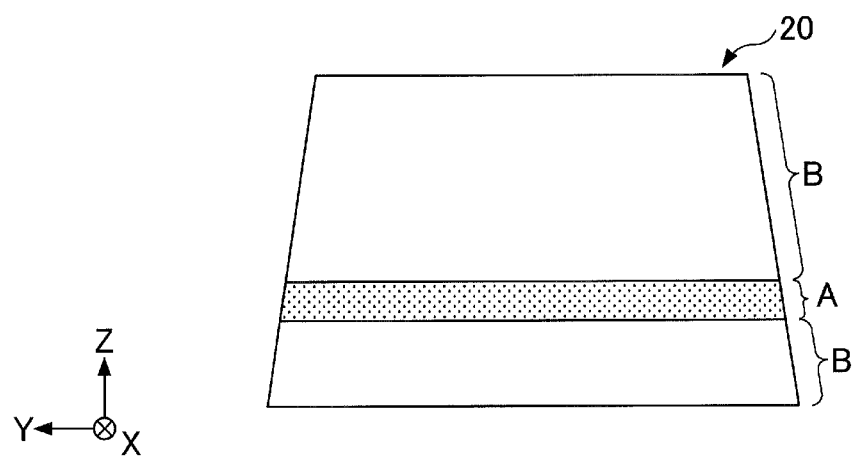
FIGS. 2A and 2B are diagrams for explaining a front windshield for a vehicle.
Figure 2B:
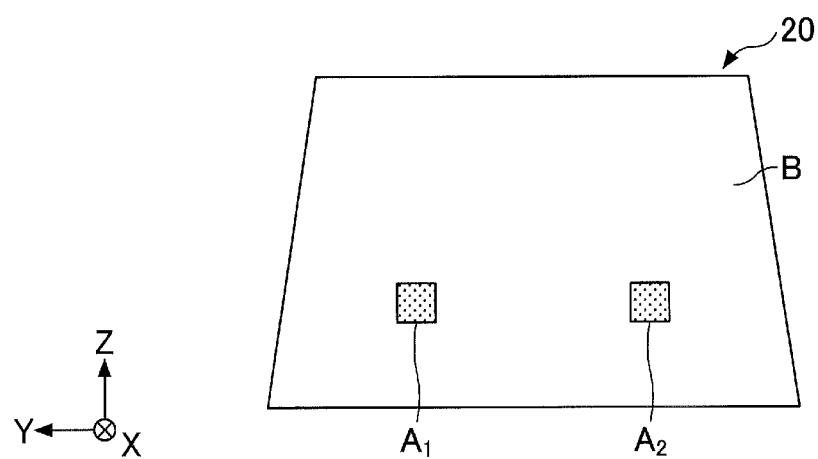

FIGS. 2A and 2B are diagrams depicting a front windshield of a vehicle, and schematically a state in which the front windshield is visually recognized from an interior of the vehicle to an exterior of the vehicle. Note that in FIGS. 2A and 2B, as a matter of convenience, a HUD display area is indicated by a dotted pattern.

As illustrated in FIG. 2A, the front windshield 20 includes an HUD display area A used for the HUD and an Area on an outside of the HUD display area B (transparent area) that is not used for the HUD. The HUD display area A is defined to be a range on the front windshield 20 that is irradiated with a light from a mirror configuring the HUD viewed from a V1 point stipulated in JIS R3212 when the mirror is rotated.

The HUD display area A is located in a lower part of the front windshield 20, and the Area on an outside of the HUD display area B is located adjacent to and around the HUD display area A in the front windshield 20. However, the HUD display area may be arranged separated into a plurality of areas in the Y-direction, such as an HUD display area $A_1$ and an HUD display area $A_2$, illustrated in FIG. 2B. Alternatively, the HUD display area may be only either one of the HUD display area $A_1$ and the HUD display area $A_2$. Alternatively, the HUD display area may be arranged separated into a plurality of areas in the Z-direction (not shown). Note that the HUD display areas A, $A_1$ and $A_2$ are representative examples of the area used in the head up display according to the present invention.

Figure 3:
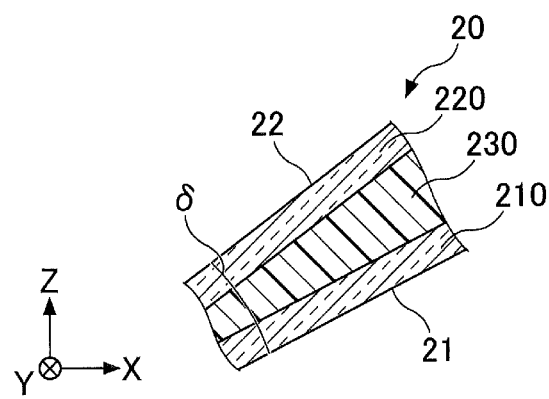
FIG. 3 is a partial cross section of the front windshield 20 illustrated in FIGS. 2A and 2B cut in an XZ-direction and viewed from a Y-direction.

FIG. 3 is a partial cross section of the front windshield 20 illustrated in FIGS. 2A and 2B cut in the XZ-direction and viewed from the Y-direction. As illustrated in FIG. 3, the front windshield 20 is a laminated glass provided with a glass plate 210 that is a first glass plate, a glass plate 220 that is a second glass plate, and an interlayer 230. In the front windshield 20, the glass plate 210 and the glass plate 220 are fixed in a state of holding the interlayer 230.

In the front windshield 20 that is a laminated glass, each of the glass plates 210 and 220 has lines generated by drawing upon manufacturing. The interlayer 230 is located between the glass plate 210 and the glass plate 220. The interlayer 230 is a film that bonds the glass plate 210 and the glass plate 220 so that the lines of the glass plate 210 are orthogonal to the lines of the glass plate 220.

The interior surface 21 of the front windshield 20 that is one surface of the glass plate 210 to be an inside of the vehicle and the exterior surface 22 of the front windshield 20 that is one surface of the glass plate 220 to be an outside of the vehicle may be flat surfaces or may be curved surfaces.

The HUD display area A is formed to have a wedge shape in a cross section in which a thickness changes from a lower end toward an upper end of the front windshield 20, when the front windshield 20 is installed in the vehicle. A wedge angle is $\delta$. In at least a part of the area where the cross section has a wedge shape of the front windshield 20, the wedge angle may vary depending on a vertical position. That is, the area where the cross section has a wedge shape of the front windshield 20 may include an area provided with a variable wedge angle.

A wedge angle in an area from an upper end of the HUD display area A to the upper end of the front windshield may be less than the wedge angle in the HUD display area A. When the wedge angle in the area from the upper end of the HUD display area A to the upper end of the front windshield is less than the wedge angle in the HUD display area A, a weight of the windshield 20 can be reduced compared with the case where the wedge angle is constant from the lower end toward the upper end of the front windshield 20, and it is preferable. Moreover, a vehicle-mounted camera may be arranged on the interior surface of the front windshield 20 and near the upper end of the front windshield 20. The vehicle-mounted camera acquires information of the exterior of the vehicle via the front windshield 20. When the thickness of the front windshield 20 is thick, a visible light transmittance may be reduced. When the wedge angle in the area from the upper end of the HUD display area A to the upper end of the front windshield is less than the wedge angle in the HUD display area A, the thickness of the front windshield 20 can be made thinner than the case where the wedge angle is constant from the lower end toward the upper end of the front windshield 20, and thereby the visible light transmittance in a transmitting area of the vehicle-mounted camera can be prevented from being reduced, which is preferable.

An average of the wedge angle $\delta$ in the HUD display area A is preferably 0.1 mrad or more. When the average wedge angle $\delta$ in the HUD display area A is 0.1 mrad or more, an effect of changing the wedge angle is fully exerted. Moreover, the average of the wedge angle $\delta$ in the HUD display area A is preferably 1.5 mrad or less, more preferably 0.7 mrad or less, further preferably 0.6 mrad or less, more preferably 0.5 mrad or less, and further preferably 0.4 mrad or less. When the average of the wedge angle $\delta$ in the HUD display area A is 1.5 mrad or less, a reflected double image can be reduced. When the average of the wedge angle $\delta$ in the HUD display area A is 0.4 mrad or less, even if a field of view (FOV) in the vertical direction (Z-direction) is 2 degrees or more (in the case of projecting an image of a greater size onto the front windshield than a conventional one), the reflected double image can be reduced. Moreover, when the average of the wedge angle $\delta$ in the HUD display area A is 0.4 mrad or less, even if a distance between the HUD image and a viewer in the horizontal direction (X-direction) becomes longer, the reflected double image can be reduced. That is, as the distance between the HUD image and the viewer in the horizontal direction (X-direction) becomes longer, the wedge angle $\delta$ is preferably smaller.

Note that the aforementioned wedge angle $\delta$ is assumed to be an average change rate of a plate thickness of the front windshield 20 using a least square method for 13 measured values, existing in respective ranges of 30 mm above and below a prescribed point, for measuring plate thickness of the front windshield 20 at distance intervals of 5 mm in the vertical direction, when the front windshield 20 is installed in the vehicle. Moreover, a slope of the aforementioned wedge angle $\delta$ is assumed to be an average change rate of the wedge angle obtained using a least squares method in the same range. Moreover, an average value of the wedge angle $\delta$ is assumed to be an average of the wedge angle $\delta$ defined as above.

In the front windshield 20, the area where the cross section has a wedge shape of the HUD display area A is formed by causing any one or more of the glass plates 210 and 220, and the interlayer 230 to have a wedge shape. That is, in FIG. 3, the glass plates 210 and 220 have constant thicknesses, and the interlayer has a wedge shape. However, the interlayer 230 may have a constant thickness and any one of or both the glass plates 210 and 220 may be formed to have a wedge shape. Alternatively, the interlayer 230 may have a wedge shape, and further any one of or both the glass plates 210 and 220 may be formed to have a wedge shape.

In the case of forming any one of or both the glass plate 210 and the glass plate 220 to have a wedge shape, a condition upon manufacturing is devised by using a float method.
That is, by controlling circumferential velocities of a plurality of rolls arranged on both ends in the width direction of a glass ribbon that moves on a melted metal, a cross section of a glass in a width direction may be a concave shape, a convex shape, or a tapered shape, and a part that has a desired thickness change may be cut out.

The glass plates 210 and 220 each includes streak-shaped fine irregularities (lines) parallel with respect to the moving direction, by an extension upon manufacturing by using the float method. Upon using as a front windshield for a vehicle, when the lines are viewed in the horizontal direction with respect to a line of sight of an observer, a distortion occurs and a visibility degrades.

For the glass plates 210 and 220, for example, a soda lime glass, an aluminosilicate glass, or an organic glass may be used. A plate thickness of the glass plate 220 located on the outside of the front windshield 20 is preferably 1.8 mm or more and 3 mm or less. When the plate thickness of the glass plate 220 is less than 1.8 mm, a stepping stone performance degrades. When the thickness is greater than 3 mm, the glass plates become heavier and difficult to be formed.

A plate thickness of the glass plate 210 located on the inside of the front windshield 20 is preferably 0.3 mm or more and 2.3 mm or less. When the plate thickness of the glass plate 210 is thinner than 0.3 mm, the handling of the glass plate becomes difficult. When the thickness is thicker than 2.3 mm, the glass plate cannot follow the shape of the interlayer 230 that is a wedged film. However, the thicknesses of the glass plates 210 and 220 are not required to be constant. The plate thickness may vary at each position, as necessary.

The front windshield 20 may have a curved shape or may not have a curved shape. In the case of the curved shape, especially when two glasses that deeply bend are formed as the glass plates 210 and 220, a shape difference between two plates (mismatch) may occur, and a glass quality after crimping (e.g. residual stress) may be greatly affected.

By using the variable wedge angle, and making the plate thickness of the glass plate 210 to be 0.3 mm or more and 2.3 mm or less, the glass quality (e.g. residual stress) can be maintained. Making the plate thickness of the glass plate 210 to be 0.3 mm or more and 2.3 mm or less, is especially effective for maintaining the glass quality (e.g. residual stress) of a glass that is deeply curved.

When the front windshield 20 has a curved shape, the glass plates 210 and 220 are shaped by the float method, and afterwards bent and formed before bonding by the interlayer 230. The bending and forming are performed while the glass is heated and softened. The heating temperature for the glass upon bending and forming is about 550° C. to 700° C.

Figure 4:
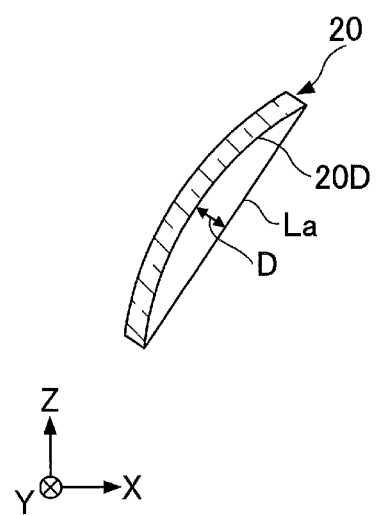
FIG. 4 is a cross section of the front windshield 20 illustrated in FIGS. 2A and 2B cut in the XZ-direction and viewed from the Y-direction.

FIG. 4 is a cross-sectional diagram depicting the front windshield 20 illustrated in FIGS. 2A and 2B, cut along the XZ-direction and viewed from the Y-direction. As illustrated in FIG. 4, in the case where the front windshield 20 has a curved shape, a distance from a line La that connects the midpoints of the opposite sides of the concave face 20D of the front windshield 20, among the longer of the two pairs of opposite sides, to the deepest portion of the concave face 20D, in a direction orthogonal to the line La, will be referred to as a maximum depth of curvature D of the front windshield 20.

When the maximum depth of curvature D of the front windshield 20 is 10 mm or more, the lines can be sufficiently extended by bending and forming, and the visibility can be sufficiently enhanced. The maximum depth of curvature D is preferably 12 mm or more, and more preferably 15 mm or more. Moreover, the radius of curvature of the concave face 20D is preferably 6000 mm or more. When the radius of curvature of the concave face 20D is 6000 mm or more, a HUD image is not likely to be distorted. The radius of curvature of the concave face 20D is more preferably 7000 mm or more, and further preferably 8000 mm or more.

Respective colors of the glass plates 210 and 220 are not especially limited, as long as a transmissivity of a visible light (Tv) is greater than 70%.

Moreover, in a peripheral portion of the front windshield 20, a shielding layer referred to as a so-called "black ceramic" is preferably present. The shielding layer is formed by applying a black ceramic ink for printing on a glass surface and baking the same. According to the shielding layer, a black obscure layer is formed in the peripheral portion of the front windshield 20. According to the black obscure layer, a resin such as a urethane for holding the front windshield 20 in the peripheral portion can be prevented from being degraded by ultraviolet light.

Moreover, a coat having a water-repellant function, an infrared light shielding function, an ultraviolet light shielding function, or a visible light reflectance reduction function, or a coat having a low radiation characteristic may be arranged on the outside of the front windshield 20 (external surface of the glass plate 220) or on the inside (internal surface of the glass plate 210).

Returning back to the description of FIG. 3, as the interlayer 230 for bonding the glass plate 210 and the glass plate 220, a thermoplastic resin is often used, including, a thermoplastic resin that has been used conventionally for this kind of purpose, such as a plasticized polyvinyl acetal resin, a plasticized polyvinyl chloride resin, a saturated polyester resin, a plasticized saturated polyester resin, a polyurethane resin, a plasticized polyurethane resin, an ethylene-vinyl acetate copolymer resin, or an ethylene-ethyl acrylate copolymer resin.

Among the above-described resins, a plasticized polyvinyl acetal resin is preferably used, because of its excellence in balance of performances, such as transparency, weather resistance, strength, bond strength, resistance to penetration, absorbability for impact energy, humidity resistance, thermal insulating property, and sound insulating property. The thermoplastic resin may be used independently, or two kinds or more resins may be used concurrently. The term "plasticized" in the plasticized polyvinyl acetal resin means that the resin is made plasticized by adding a plasticizing agent. The same applies to the other plasticized resins.

The polyvinyl acetal resin may include a polyvinyl formal resin that is obtained by reacting a polyvinyl alcohol (in the following, may be referred to as "PVA" as necessary) and a formaldehyde, a narrowly defined polyvinyl acetal resin that is obtained by reacting a PVA and an acetaldehyde, a polyvinyl butyral resin (in the following, may be referred to as "PVB" as necessary) that is obtained by reacting a PVA and a n-butyl aldehyde, and the like. Especially, a PVB is preferable, because of its excellence in balance of performances, such as transparency, weather resistance, strength, bond strength, resistance to penetration, absorbability for impact energy, humidity resistance, thermal insulating property, and sound insulating property. The polyvinyl acetal resin may be used independently, or two kinds or more resins may be used concurrently. However, a material forming the interlayer 230 is not limited to a thermoplastic resin.

A thickness of the interlayer 230 is preferably 0.5 mm or more even at the thinnest portion. When the thickness of the interlayer 230 is less than 0.5 mm, a resistance to penetration that is required for a front windshield is not secured. Moreover, the thickness of the interlayer 230 is preferably 3 mm or less even at the thickest portion. When the thickness of the interlayer 230 is greater than 3 mm, a weight becomes greater, and a handleability becomes worse.

The interlayer 230 may be provided with a region having a sound insulation function, an infrared light shielding function, an ultraviolet light shielding function, a shade band (function of reducing a visible light transmittance), or the like. Moreover, the interlayer 230 may include three or more layers. For example, by configuring the interlayer 230 with three layers, and making hardness of the central layer less than hardness of both adjacent layers, the sound insulation function can be enhanced. In this case, hardness of both the layers may be the same or may be different from each other.

In this way, when the number of layers of the interlayer 230 increases, thicknesses of the respective layers vary, and for example, an optical quality such as the transmitted double image which is described above may be further degraded. In this case, by making the plate thickness of the glass plate 210 greater than or equal to 0.3 mm but less than or equal to 2.3 mm, the glass plate 210 will easily follow the wedge film of the interlayer 230, and thereby the optical quality can be prevented from degrading. That is, making the plate thickness of the glass plate 210 greater than or equal to 0.3 mm but less than or equal to 2.3 mm is especially effective when the layer number in the interlayer 230 increases.

Typically, a light source for HUD is located in a lower part of the vehicle interior, and projects an image toward the laminated glass. Because the projected image is reflected on the rear surface and the front surface of the glass plates 210 and 220, in order to overlay both the reflected images so as not to generate a double image, the thickness of the glass is required to vary in parallel with respect to the projection direction. When the thickness of the glass plate 210 varies in a direction orthogonal to the lines, in order to be used as a glass on which information is projected, the direction of the lines is orthogonal to the projection direction, i.e. the lines are in a horizontal direction with a line of sight of an observer on an inside of the vehicle interior (driver), and use in a direction in which the visibility degrades becomes required.

In order to improve the visibility, the laminated glass prepared using the glass plate 210, the glass plate 220, and the interlayer 230 is arranged so that the lines of the glass plate 210 are orthogonal to the lines of the glass plate 220. According to the above-described arrangement, the distortion, which deteriorates with use of the glass plate 210 only, will be reduced by the presence of the glass plate 220, having the orthogonal lines as described, and the interlayer 230 that is bonded to the glass plate 210 and the glass plate 220, and the visibility is improved.

When the glass plates 210 and 220 are not wedge glass, for both the glass plates 210 and 220, the lines are orthogonal to the line of sight of the observer on the inside of the vehicle interior (driver), and thereby the visibility does not degrade.

In order to prepare the interlayer 230, for example, the aforementioned resin material that configures the interlayer 230 is properly selected, and extruded and formed using an extruder in a heated and molten state. An extrusion condition such as an extrusion speed of the extruder is set to be uniform. Afterwards, the resin film that was extruded and formed is extended so that an upper side and a lower side have curvatures fitting to the shape of the front windshield 20, and thereby the interlayer 230 is completed.

In order to prepare the laminated glass, the extended interlayer 230 is held between the glass plate 210 and the glass plate 220 to form a laminated body. Then, the laminated body is placed into a rubber sack, and the bonding is performed under a vacuum of −65 to −100 kPa, and at a temperature of about 70 to 110° C.

Furthermore, for example, by performing a pressure bonding process of heating and pressurizing under a condition of a temperature of 100 to 150° C., and a pressure of 0.6 to 1.3 MPa, a laminated glass that is more excellent in durability can be obtained. However, in some cases, taking into account simplification of processes, and characteristic of a material enclosed in the laminated glass, the heating and pressurizing process may not need to be used.

Note that between the glass plate 210 and the glass plate 220, other than the interlayer 230, a film or a device having a function of a heating wire, infrared light reflection, a light emission, a power generation, dimming, visible light reflection, scattering, decoration, absorption or the like may be arranged.

Figure 5A:
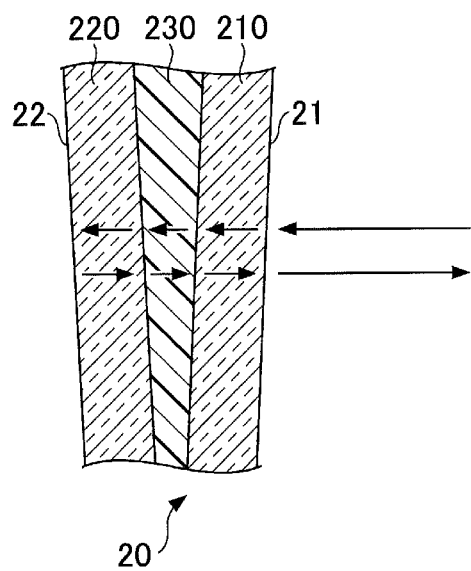
FIGS. 5A and 5B are diagrams for explaining a visible light transmittance of a laminated glass.
Figure 5B:
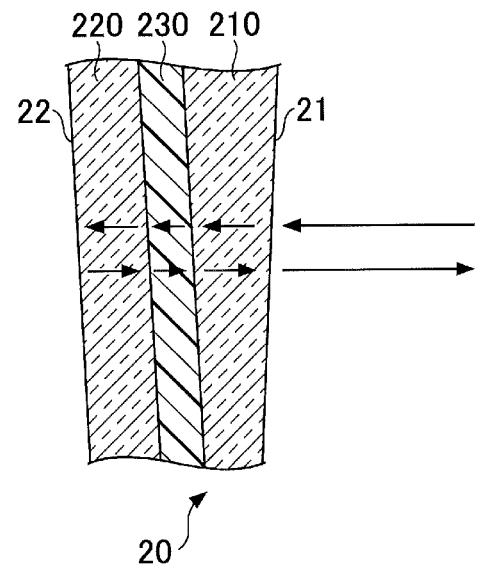

FIGS. 5A and 5B are diagrams for explaining a visible light transmittance of a laminated glass (front windshield). FIG. 5A depicts a cross section of the laminated glass in which the interlayer 230 has a wedge shape, and FIG. 5B depicts a cross section of the laminated glass in which the glass plate 210 has a wedge shape. Moreover, as an example, the case where the interlayer 230 is formed of PVB (with low infrared light shielding function) and the glass plate 210 is formed of a green glass will be described here.

Comparing a green glass and a PVB having low infrared light shielding function, the green glass has a lower visible light transmittance per unit thickness than the PVB. Thus, in the case where the front windshield 20 in FIG. 5A and in FIG. 5B has the same shape (thickness at each position in the vertical direction is the same), the visible light transmittance of the entire laminated glass of FIG. 5B is lower than that of FIG. 5A. As a result, a reflected double image of FIG. 5B is darker than that of FIG. 5A. The reason will be described with reference to FIGS. 5A and 5B.

Figure 6A:
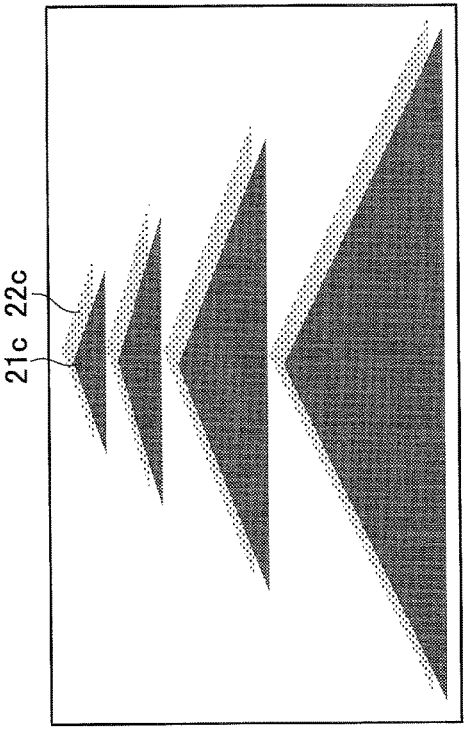
FIGS. 6A to 6C are diagrams depicting an example of luminance configurations of a primary image and a reflected double image.
Figure 6B:
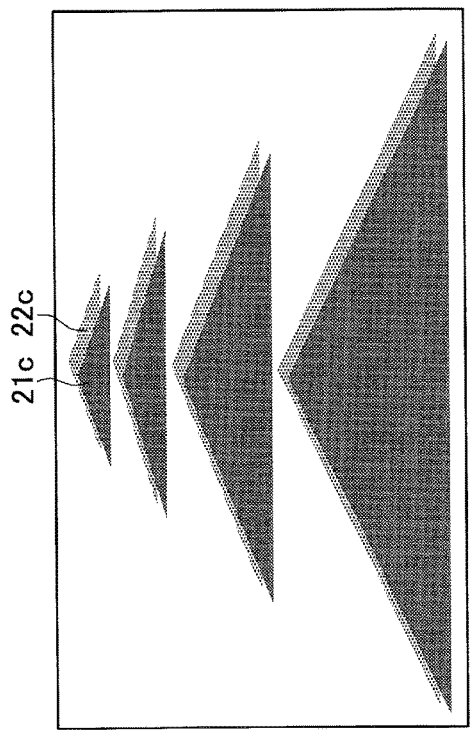
Figure 6C:
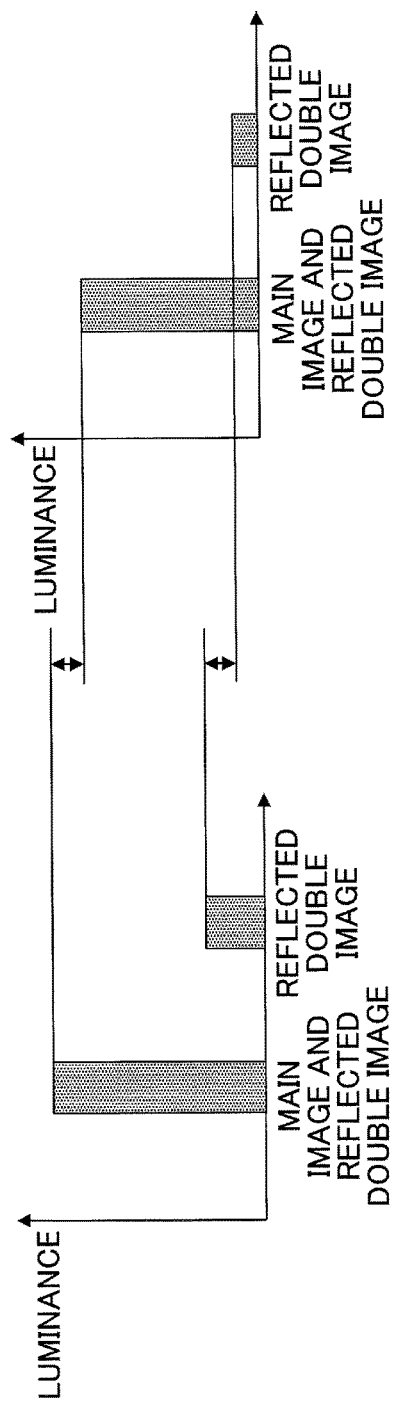

FIGS. 6A to 6C are diagrams depicting an example of luminance configurations of a primary image and a reflected double image, and schematically illustrates the case where positions of the primary image and of the reflected double image are shifted from each other due to an error of a wedge angle in the laminated glass. Moreover, FIG. 6A illustrates the front windshield of FIG. 5A, and FIG. 6B illustrates the front windshield of FIG. 5B. In FIGS. 6A to 6C, elements indicated by reference numerals 21c schematically represent the primary image, and elements indicated by reference numerals 22c schematically represent the reflected double image.

Comparing FIG. 6A and FIG. 6B, it is found that a sum of the luminance of the primary image 21c plus the luminance of the reflected double image 22c in FIG. 6B, and the luminance of the reflected double image 22c in FIG. 6B alone are respectively lower by the same proportion than a sum of the luminance of the primary image 21c plus the luminance of the reflected double image 22c in FIG. 6A, and the luminance of the reflected double image 22c in FIG. 6A alone.

Because the primary image plus the reflected double image are intrinsically bright and the proportion of decrease of luminance is small, even if FIG. 6B and FIG. 6A are compared, a viewer is unlikely to recognize that the sum of the luminance of the primary image 21c plus the luminance of the reflected double image 22c in FIG. 6B is lower (darker) than the sum of the luminance of the primary image 21c plus the luminance of the reflected double image 22c in FIG. 6A.

In contrast, because the proportion of decrease of luminance of the reflected double image 22c is large, a ratio of (the luminance of the reflected double image 22c) to (the sum of the luminance of the primary image 21c plus the luminance of the reflected double image 22c) of FIG. 6B is significantly lower than that of FIG. 6A. Then, comparing FIG. 6A and FIG. 6B, the viewer is likely to recognize that the reflected double image 22c of FIG. 6B is darker than the reflected double image 22c of FIG. 6A. That is, in FIG. 6B, the reflected double image is less conspicuous compared with FIG. 6A.

In this way, although in a laminated glass having a wedge angle, when an error occurs in the wedge angle, positions of the primary image 21c and the reflected double image 22c are shifted from each other, and the reflected double image 22c is viewed, by reducing a visible light transmittance of the entire laminated glass, the reflected double image can be made less conspicuous.

Figure 7:
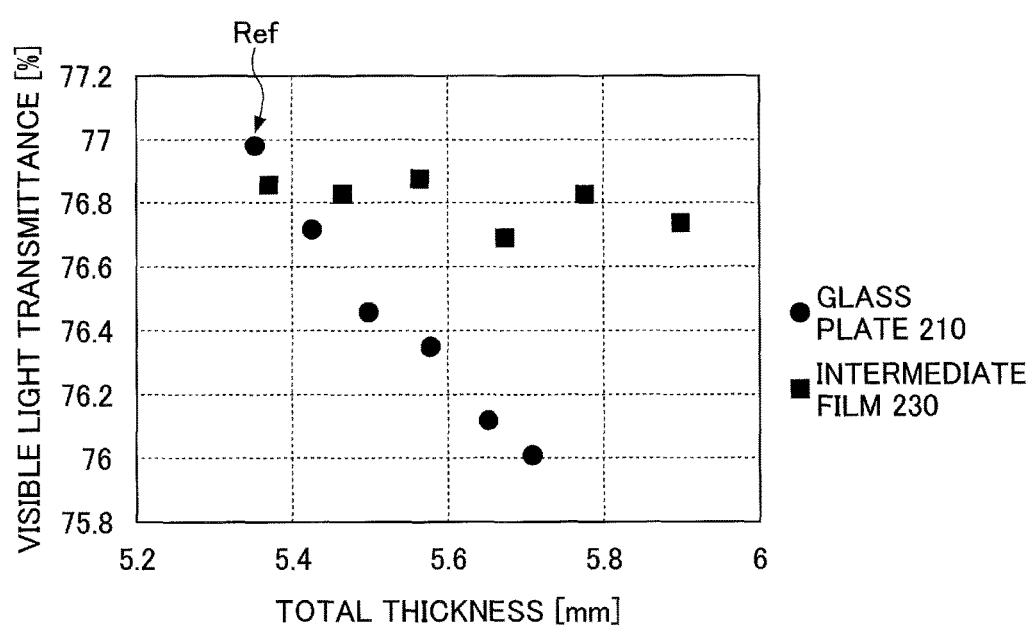
FIG. 7 is a diagram depicting an example of results of measurement for a relation between a total thickness of the laminated glass and a visible light transmittance of the laminated glass.

FIG. 7 is a diagram depicting an example of results of measurement for a relation between a total thickness of the laminated glass and a visible light transmittance of the laminated glass, and illustrates a case where a thickness of the glass plate 210 configured of a green glass is varied (circles) and a case where a thickness of the interlayer 230 configured of PVB is varied (squares). However, in the measurement, a thickness of the laminated glass is constant and does not have a region of a wedge shape.

Moreover, FIG. 7 shows results of measurement of the visible light transmittance of the laminated glass in the case where the thickness of the glass plate 210 or the thickness of the interlayer 230 is varied, with reference to the case (Ref) where the thickness of the glass plate 210 is 2.3 mm, the thickness of the interlayer 230 is 0.86 mm and the thickness of the glass plate 220 is 2.3 mm.

As illustrated in FIG. 7, a magnitude of decrease of the visible light transmittance of the laminated glass in the case of increasing the thickness of the glass plate 210 is greater than that in the case of increasing the thickness of the interlayer 230. Thus, it is found that an effect of making the reflected double image darker (less conspicuous) in the case of increasing the thickness of the glass plate 210 is greater than an effect in the case of increasing the thickness of the interlayer 230.

Figure 8:
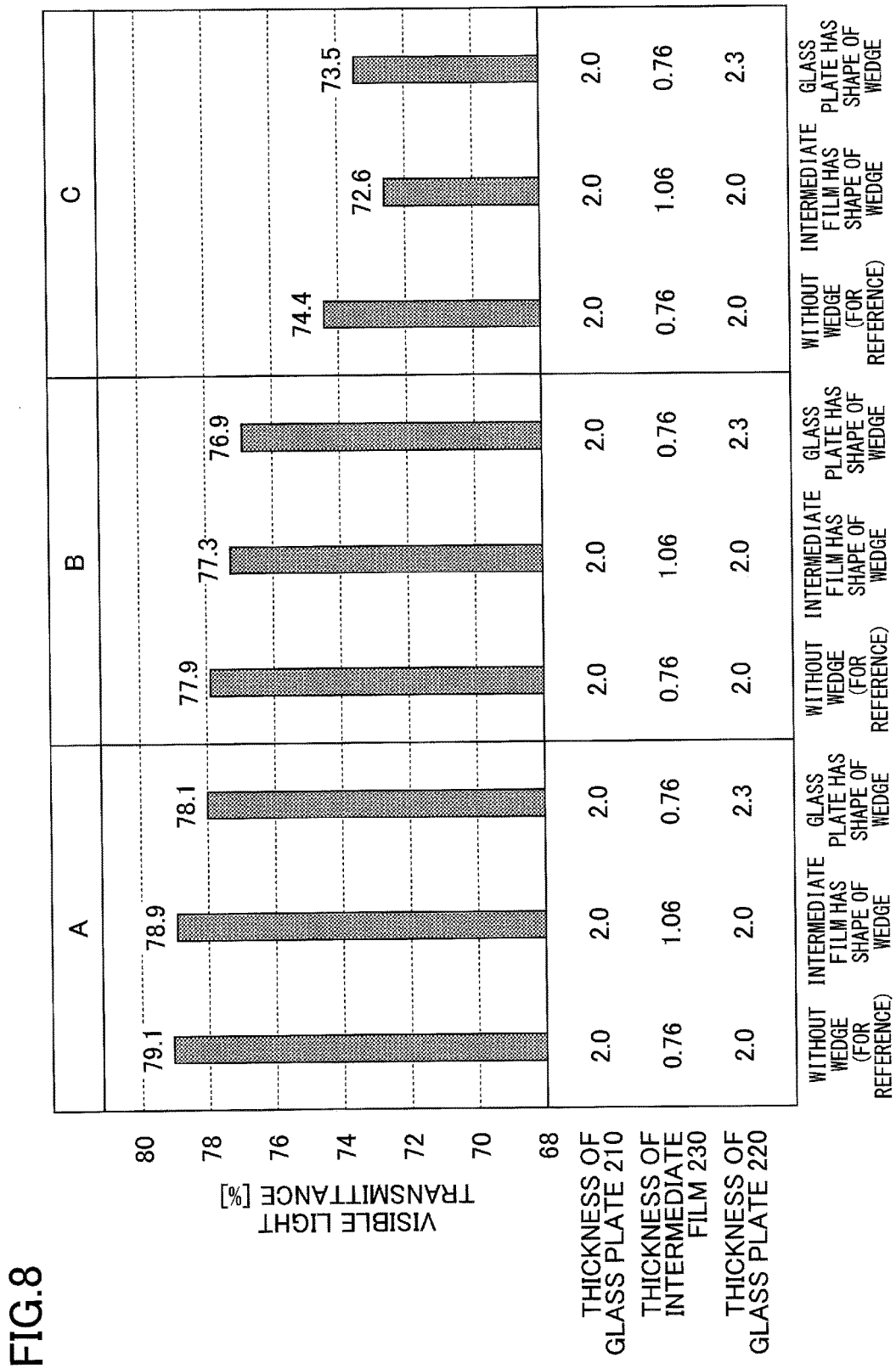
FIG. 8 is a diagram depicting an example of changes in the visible light transmittance of the laminated glass in the case where any one of the glass plate 220 and the interlayer 230 has a wedge shape.

FIG. 8 is a diagram depicting an example of changes in the visible light transmittance of the laminated glass in the case where one of the glass plate 220 and the interlayer 230 has a wedge shape. That is, a vertical axis of FIG. 8 indicates the visible light transmittance (%) of the laminated glass.

The bar graph in the left section "A" in FIG. 8 show a result when the interlayer 230 is configured of PVB (with low infrared light shielding function) and the glass plates 210 and 220 are configured of a green glass. That is, in this case, the visible light transmittance per unit thickness of the glass plates 210 and 220 is lower than that of the interlayer 230.

The bar graph in the central section "B" in FIG. 8 show a result when the infrared light shielding function of PVB is strengthened so that the visible light transmittance per unit thickness of the interlayer 230 is made lower than that of the section "A" in FIG. 8. However, also in this case, in the same way as the left section "A" of FIG. 8, the visible light transmittance per unit thickness of the glass plates 210 and 220 is lower than that of the interlayer 230. Note that, typically, when the infrared light shielding function is added, not only the infrared light transmittance decreases, but also the visible light transmittance decreases.

The bar graph in the right section "C" in FIG. 8 show a result when the infrared light shielding function of PVB is further strengthened than the case of "B" in FIG. 8 so that the visible light transmittance per unit thickness of the interlayer 230 is made lower than that of the section "B" in FIG. 8. In the section "C", different from the sections "A" and "B" in FIG. 8, the visible light transmittance per unit thickness of the interlayer 230 is lower than the visible light transmittance per unit thickness of the glass plates 210 and 220.

Moreover, in each of the sections "A", "B" and "C" in FIG. 8, the left bar indicates the case where a thickness of each of the glass plates 210 and 220 and the interlayer 230 is constant, i.e. none of them has a wedge shape, as a reference. Moreover, the central bar indicates a measured value of a thickness in the HUD display area at a position of the greatest total thickness in the case where only the interlayer 230 has a wedge shape. Moreover, the right bar indicates a measured valued of a thickness in the HUD display area at the position of the greatest total thickness in the case where only the glass plate 220 has a wedge shape.

As shown in the sections "A" and "B" in FIG. 8, when the visible light transmittance per unit thickness of the glass plates 210 and 220 is lower than the visible light transmittance per unit thickness of the interlayer 230, the visible light transmittance of the laminated glass in the case where the glass plate 210 or 220 has a wedge shape (right bar) can be reduced more greatly than that in the case where the interlayer 230 has a wedge shape (central bar).

In contrast, as shown in the section "C" in FIG. 8, when the visible light transmittance per unit thickness of the interlayer 230 is lower than the visible light transmittance per unit thickness of the glass plates 210 and 220, the visible light transmittance of the laminated glass in the case where the interlayer 230 has a wedge shape (central bar) can be reduced more greatly than that in the case where the glass plate 210 or 220 has a wedge shape (right bar).

That is, in the case where a member with the lowest visible light transmittance per unit thickness of the members constituting the laminated glass, i.e. from among the glass plates 210 and 220 and the interlayer 230, has a wedge shape, the visible light transmittance of the entire laminated glass can be significantly reduced. As a result, it becomes possible to enhance the effect of making a reflected double image darker (less conspicuous).

Note that, in the aforementioned example, the infrared light shielding function is imparted to the interlayer 230, and thereby the visible light transmittance per unit thickness of the interlayer 230 is reduced. However, the visible light transmittance per unit thickness of the interlayer 230 may be reduced by other methods.

As described above, the thickness of the interlayer 230 is preferably 0.5 mm or more at the thinnest portion. In the case where the interlayer 230 has a wedge shape, the thickness of the interlayer 230 in the HUD display area is preferably 0.65 mm or more at the thinnest portion. The thickness is more preferably 0.7 mm or more, is more preferably 0.75 mm or more, is more preferably 0.8 mm or more, is more preferably 0.9 mm or more, and is further preferably 1.0 mm or more. When the thickness of the interlayer 230 in the HUD display area is 0.65 mm or more at the thinnest portion, the visible light transmittance can be significantly reduced. When the thickness of the interlayer 230 in the HUD display area is 0.8 mm or more at the thinnest portion, the visible light transmittance can be significantly reduced and at the same time a flow of a thermal energy, such as solar radiation, from outside through the HUD display area can be reduced. Thus, an HUD light source 10 or the like on an inside of the vehicle can be prevented from being heated by the thermal energy from outside.

When the laminated glass has a wedge shape, the visible light transmittance of the laminated glass at the thickest portion within the HUD display area (upper end of the HUD display area in the vertical direction) is different from that at the thinnest portion (lower end of the HUD display area in the vertical direction). Then, a relation between a difference in a thickness at the thickest portion and the thinnest portion of the laminated glass within the HUD display area, $\Delta t$, and a difference in a visible light transmittance of the laminated glass at the thickest portion and the thinnest portion of the laminated glass within the HUD display area, $\Delta Tv$, will be considered in the case where the interlayer 230 is configured of PVB and the glass plate 210 is configured of a green glass.

Figure 9:
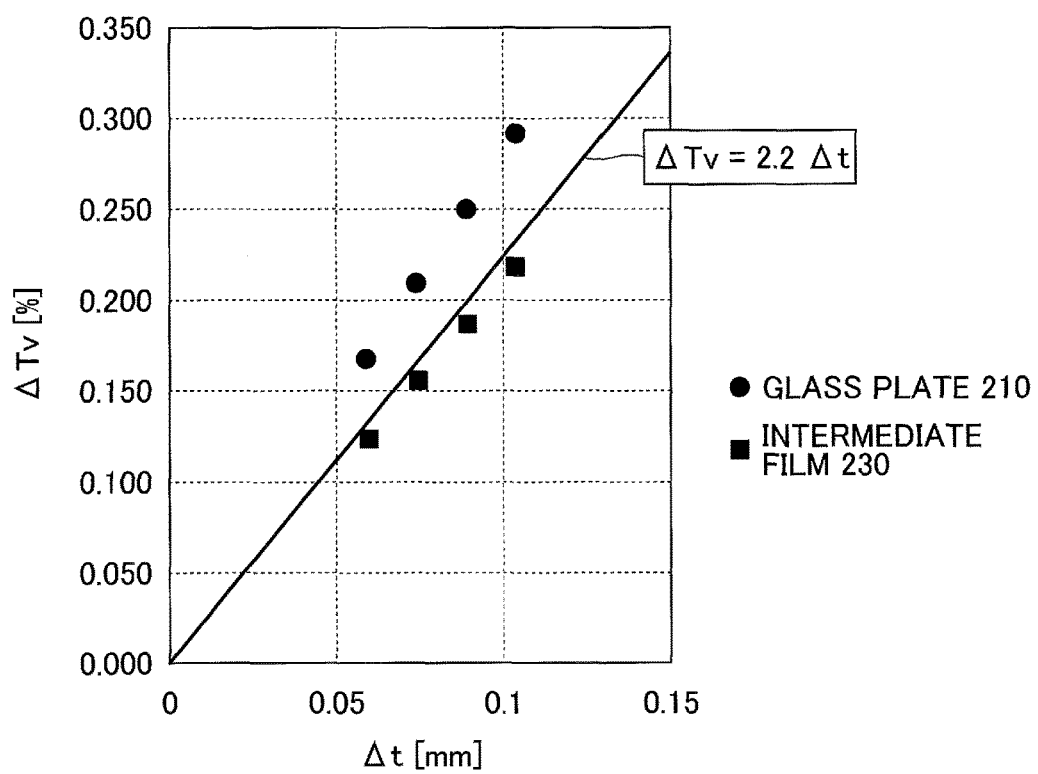
FIG. 9 is a diagram depicting an example of a relation between a difference in a thickness $\Delta t$ and a difference in the visible light transmittance $\Delta Tv$.

FIG. 9 is a diagram depicting an example of a relation between a difference in a thickness $\Delta t$ and a difference in the visible light transmittance $\Delta Tv$. In FIG. 9, the case where interlayer 230 configured of PVB having the infrared light shielding function has a wedge shape and the case where the glass plate 210 configured of a green glass has a wedge shape are compared. TABLE 1 shows measured values which are plotted in FIG. 9.

TABLE 1

| difference in thickness $\Delta t$ [mm] | | 0.06 | 0.075 | 0.09 | 0.105 |
|---|---|---|---|---|---|
| difference in visible light transmittance $\Delta Tv$ [%] | interlayer has wedge shape | 0.125 | 0.156 | 0.187 | 0.218 |
| | glass plate has wedge shape | 0.166 | 0.208 | 0.249 | 0.291 |

As illustrated in TABLE 1 and FIG. 9, in both the cases where the interlayer 230 has a wedge shape and the case where the glass plate has a wedge shape, the difference in a thickness $\Delta t$ is proportional to the difference in a visible light transmittance $\Delta Tv$. Furthermore, a slope in the case where the glass plate 210 has a wedge shape is steeper than that in the case where the interlayer 230 has a wedge shape.

Moreover, an inclination line shown in FIG. 9 represents a relation $\Delta Tv=2.2\Delta t$. The inclination line was obtained from experimentally obtained levels where more than half of ten examinees could recognize the effect of darkening reflected double images (becoming less conspicuous). That is, when the difference in the visible light transmittance $\Delta Tv$ is greater than 2.2 times the difference in the thickness $\Delta t$, $\Delta Tv \geq 2.2\Delta t$, the visible light transmittance of the entire laminated glass is reduced, and thereby the effect of darkening (making less conspicuous) a reflected double image can be obtained sufficiently.

Note that in the aforementioned example, the case where the visible light transmittance per unit thickness of the glass plates 210 and 220 is lower than that of the interlayer 230 was considered. However, also in the case where the visible light transmittance per unit thickness of the glass plates 210 and 220 is greater than that of the interlayer 230, similar results as in FIG. 9 will be obtained. In this case, in FIG. 9, data points of the case where the interlayer 230 has a wedge shape are located above the inclination line.

That is, in order to satisfy the relation $\Delta Tv \geq 2.2\Delta t$, it will be effective when a member with the lowest visible light transmittance per unit thickness of the members constituting the laminated glass, i.e. the glass plates 210 and 220 and the interlayer 230, has a wedge shape, and a thickness thereof is adjusted.

In contrast, despite the decrease in the visible light transmittance of the laminated glass, the examinees did not recognize the decrease in the luminance of the entire HUD image. Thus, the relation $\Delta Tv \geq 2.2\Delta t$ represents a condition of reducing visibility of a reflected double image while a decrease in a sum of a luminance of a primary image plus a luminance of the reflected double image is prevented from being recognized.

In this way, in either of the cases where the interlayer has a wedge shape and the case where the glass plate has a wedge shape, when the relation $\Delta Tv \geq 2.2\Delta t$ is satisfied, the visible light transmittance of the entire laminated glass can be reduced significantly. As a result, a great effect of darkening (making less conspicuous) reflected double images can be obtained.

In order to obtain a greater effect, the relation is preferably $\Delta Tv \geq 2.4\Delta t$, and further preferably $\Delta Tv \geq 2.6\Delta t$. When the relation $\Delta Tv \geq 2.4\Delta t$ is satisfied, while reducing the luminance of a reflected double image, the decrease in the sum of the luminance of the primary image and the luminance of the reflected double image can be prevented from being recognized by an observer. When the relation $\Delta Tv \geq 2.6\Delta t$ is satisfied, while reducing the luminance of a reflected double image, the decrease in the sum of the luminance of the primary image plus the luminance of the reflected double image can be further prevented from being recognized by an observer.

As described above, the preferred embodiments and the like have been described in detail. However, the present invention is not limited to the above-described specific embodiments, and various variations and modifications may be added without deviating from the scope of the present invention to the aforementioned embodiments.

REFERENCE SIGNS LIST

10,40 light source
11a,11b,12a,12b,41a,41b,42a,42b beam
11c,12c,41c,42c image
20 front windshield
21c primary image
22c reflected double image
20D concave face
21 interior surface
22 exterior surface
30 eye
210,220 glass plate
230 interlayer
A,A$_1$,A$_2$ HUD display area
B area outside HUD display area
δ wedge angle

What is claimed is:

1. A laminated glass comprising:
    a first glass plate to be arranged on an inner side of a vehicle;
    a second glass plate to be arranged on an outer side of the vehicle;
    an interlayer located between the first glass plate and the second glass plate and bonded to the first glass plate and the second glass plate; and
    a display area configured to be used for a head up display, wherein the display area includes a region having a wedge shape in a cross section, a thickness at an upper end of the region in a vertical direction being greater than a thickness at a lower end of the region, when the laminated glass is installed on the vehicle, wherein a difference in thickness, $\Delta t$ [mm], between a thickness of the laminated glass at a thickest portion in the display area and a thickness of the laminated glass at a thinnest portion in the display area, and a difference in visible light transmittance, $\Delta Tv$ [%], between a visible light transmittance of the laminated glass at the thickest portion in the display area and a visible light transmittance of the laminated glass at the thinnest portion in the display area, satisfy a relation of $\Delta Tv \geq 2.2 \Delta t$, and
    wherein a member with a lowest visible light transmittance per unit thickness from among the first glass plate, the second glass plate and the interlayer has a wedge shape in a cross section.

2. The laminated glass according to claim 1, wherein the difference in thickness, $\Delta t$ [mm], and the difference in visible light transmittance, $\Delta Tv$ [%], satisfy a relation of $\Delta Tv \geq 2.4 \Delta t$.

3. The laminated glass according to claim 2, wherein the difference in thickness, $\Delta t$ [mm], and the difference in visible light transmittance, $\Delta Tv$ [%], satisfy a relation of $\Delta Tv \geq 2.6 \Delta t$.

4. The laminated glass according to claim 1, wherein either or both of the first glass plate and the second glass plate has a wedge shape in a cross section.

5. The laminated glass according to claim 1, wherein the interlayer has a wedge shape in a cross section, and
wherein a thickness of the interlayer at a thinnest portion in the display area is 0.65 mm or more.

6. The laminated glass according to claim 1, wherein the interlayer includes a polyvinyl butyral resin, and the first glass plate and the second glass plate are formed of a green glass.

7. The laminated glass according to claim 1, wherein an average value of a wedge angle in the region having a wedge shape in a cross section is 1.5 mrad or less.

8. The laminated glass according to claim 1, wherein an average value of a wedge angle in the region having a wedge shape in a cross section is 0.4 mrad or less.

9. The laminated glass according to claim 1, wherein a radius of curvature of the laminated glass in the vertical direction is 6000 mm or more.

10. A laminated glass comprising:
    a first glass plate to be arranged on an inner side of a vehicle;
    a second glass plate to be arranged on an outer side of the vehicle;
    an interlayer located between the first glass plate and the second glass plate and bonded to the first glass plate and the second glass plate; and
    a display area configured to be used for a head up display, wherein the display area includes a region having a wedge shape in a cross section, a thickness at an upper end of the region in a vertical direction being greater than a thickness at a lower end of the region, when the laminated glass is installed on the vehicle, wherein a difference in thickness, $\Delta t$ [mm], between a thickness of the laminated glass at a thickest portion in the display area and a thickness of the laminated glass at a thinnest portion in the display area, and a difference in visible light transmittance, $\Delta Tv$ [%], between a visible light transmittance of the laminated glass at the thickest portion in the display area and a visible light transmittance of the laminated glass at the thinnest portion in the display area, satisfy a relation of $\Delta Tv \geq 2.2 \Delta t$, and wherein a wedge angle in an area from an upper end of the display area to an upper end of the laminated glass is less than a wedge angle in the region having a wedge shape in a cross section.

11. The laminated glass according to claim 10, wherein the difference in thickness, $\Delta t$ [mm], and the difference in visible light transmittance, $\Delta Tv$ [%], satisfy a relation of $\Delta Tv \geq 2.4 \Delta t$.

12. The laminated glass according to claim 11, wherein the difference in thickness, $\Delta t$ [mm], and the difference in visible light transmittance, $\Delta Tv$ [%], satisfy a relation of $\Delta Tv \geq 2.6 \Delta t$.

13. The laminated glass according to claim 10, wherein a member with a lowest visible light transmittance per unit thickness from among the first glass plate, the second glass plate and the interlayer has a wedge shape in a cross section.

14. The laminated glass according to claim 13, wherein either or both of the first glass plate and the second glass plate has a wedge shape in a cross section.

15. The laminated glass according to claim 13, wherein a member with a lowest visible light transmittance per unit thickness from among the first glass plate, the second glass plate and the interlayer has a wedge shape in a cross section, wherein the interlayer has a wedge shape in a cross section, and wherein a thickness of the interlayer at a thinnest portion in the display area is 0.65 mm or more.

16. The laminated glass according to claim 10, wherein the interlayer includes a polyvinyl butyral resin, and the first glass plate and the second glass plate are formed of a green glass.

17. The laminated glass according to claim 10, wherein an average value of a wedge angle in the region having a wedge shape in a cross section is 1.5 mrad or less.

18. The laminated glass according to claim 10, wherein an average value of a wedge angle in the region having a wedge shape in a cross section is 0.4 mrad or less.

19. The laminated glass according to claim 10, wherein a radius of curvature of the laminated glass in the vertical direction is 6000 mm or more.

* * * * *